(No Model.)
C. P. STEINMETZ.
MEAL BOLT.
No. 414,925. Patented Nov. 12, 1889.
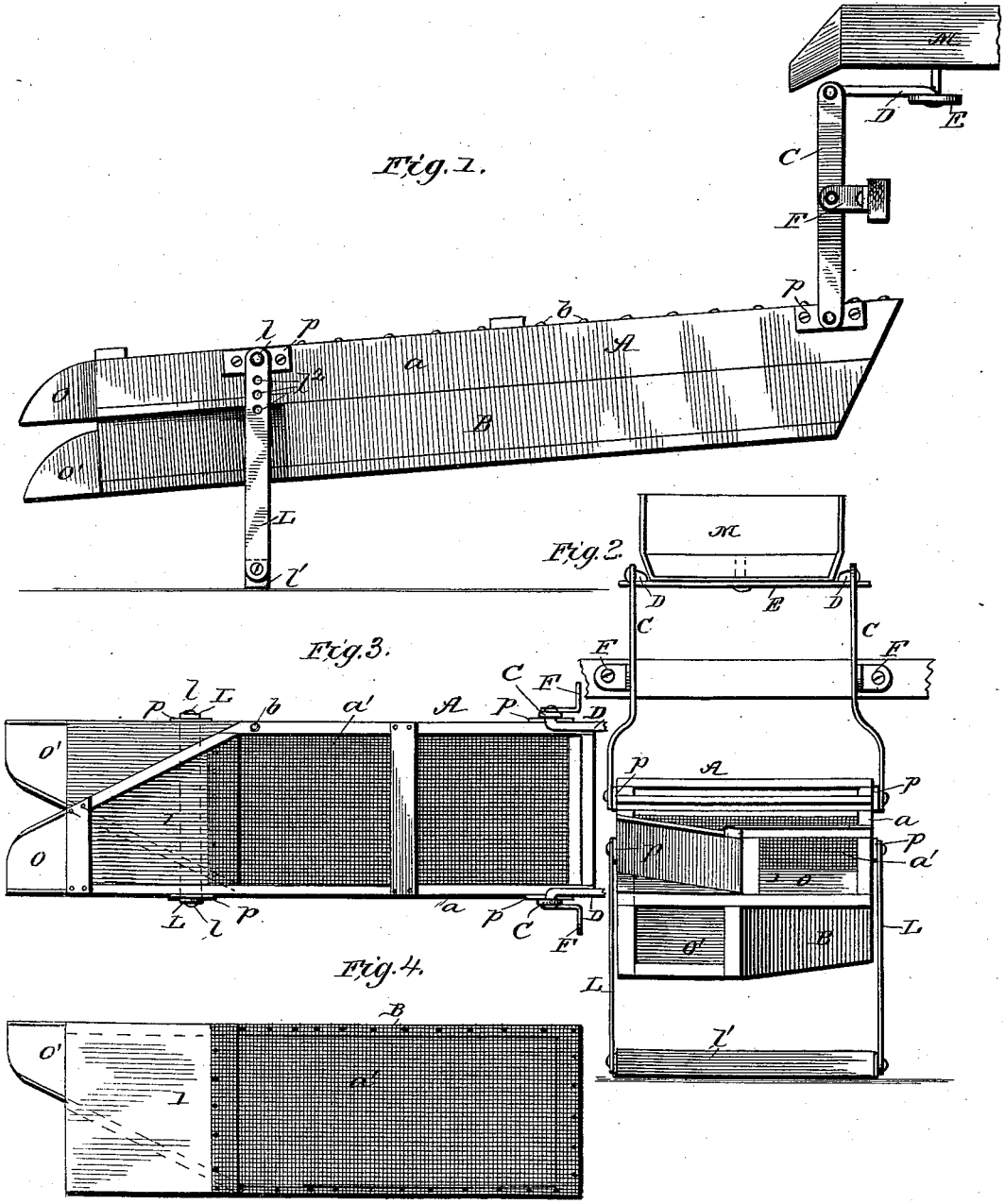
WITNESSES.
Fred G. Dieterich
Jos. A. Ryan
INVENTOR
Conrad P. Steinmetz.
BY Munn & Co
ATTORNEY
N. PETERS, Photo-Lithographer, Washington, D. C.

UNITED STATES PATENT OFFICE.

CONRAD P. STEINMETZ, OF MITCHELL, DAKOTA TERRITORY.

MEAL-BOLT.

SPECIFICATION forming part of Letters Patent No. 414,925, dated November 12, 1889.

Application filed May 28, 1889. Serial No. 312,447. (No model.)

*To all whom it may concern:*

Be it known that I, CONRAD P. STEINMETZ, of Mitchell, Davison county, Dakota Territory, have invented certain new and useful Improvements in Meal-Bolters, of which the following is a specification.

My invention relates to an improved shaking bolter, particularly adapted for bolting cornmeal, buckwheat, and other coarse grain; and it consists of a screen secured to the shaking-box of a feed-mill and receiving its motion from the same; and it consists, further, in certain details of construction and combination of parts, as will more fully hereinafter appear.

In the accompanying drawings, Figure 1 represents a side elevation of my improved bolter, the shaking-box also being shown. Fig. 2 represents a front view of the same; Fig. 3, a plan view; Fig. 4, a plan view of the trough.

In carrying out my invention I employ a screen A, constructed, as usual, of the frame $a$ and sieve-bottom $a'$, the forward portion of the frame being tapered, as clearly shown in Fig. 3, said tapered portion having a solid bottom $l$, thus forming a chute or spout $o$ for carrying off the bran or grain that accumulates upon the sieve $a'$. Arranged directly beneath the screen is a trough B, said trough being made of a size to correspond to the screen A, and said screen is secured to the trough by means of screws, pins, or bolts $b$, passing vertically through the sides of the screen-frame and engaging with apertures made in the sides of the trough. These particular means are not essential, however, and any suitable means may be employed to connect the screen and trough. The forward end of the trough is tapered in a direction reverse to the taper of the screen, and the solid bottom $l$ of the chute, formed at the forward end of the screen, is extended beyond the sides of the screen-frame and forms a solid top for the chute $o'$ of the trough. By this arrangement the sifted grain is carried off through the chute $o'$, and the bran, &c., is carried out through the chute $o$ at different points and all danger of mixing is entirely prevented.

The bolter is supported at its rear end by being attached to the shaking-box of the feed-mill or other vibrating object, the forward end being supported by the legs L, said legs, preferably two in number, being arranged one upon each side at opposite points, pivotally secured at their upper ends to the screen-frame at $l$, the lower ends of the legs being pivotally secured to a transverse cross-bar or cleat $l'$, securely fastened to the floor. Near the upper ends of the legs L are a series of apertures $l^2$, by means of which the bolter may be regulated at any desired height, the bolter usually being inclined, as shown in Fig. 1.

To secure the bolter to the shaking-box or other vibrating power, I employ the lever-arms C, two in number, and arranged at opposite points, said arms being pivotally secured at their lower ends to the rear end of the screen-frame, and at their upper ends are likewise connected to the forward ends of the link arms or rods D, said rods D being horizontal, extending to the rear, and are connected by any suitable means to a flat cross-bar E, which is rigidly secured to the bottom of the shaking-box M.

In order to prevent any wear upon the sides of the screen, I employ the metallic plate $p$, placed between the legs L and lever-arms C, and the screen-frame at their points of attachment thereto.

To vibrate the lever-arms C it is necessary to provide a very rigid fulcrum, and this I do by using the angle-irons F, the forward ends of said irons being fastened to the vibrating lever-arms C, their rear angled portions being securely bolted to the frame of the mill or other rigid support.

The operation of my device is as follows: The parts having been constructed and arranged as described, the grain to be sifted is fed from the box M by shaking onto the sieve A. The shaking motion of the box imparts a vibratory motion to the arms C by means of the connecting-rods D, and as the arms C vibrate the sieve will oscillate horizontally upon the pivotal supports L, the fine grain passing through the sieve and being fed out through the chute or spout $o$, while the bran and coarser particles of grain are kept upon the screen and are gradually fed out through the chute or spout $o'$.

Having thus described my invention, what I claim as new, and desire to secure by Letters Patent, is—

In a meal-bolter, the combination, with the frame and shaking-box M, of the flat cross-bar E, rigidly secured to the bottom of said box, the horizontal connecting-rods D D, connected to the cross-bar, the vertical vibrating arms C C, pivotally connected at their upper ends to the connecting-rods D D and fulcrumed at their center to the angle-irons F F, rigidly secured to the frame, and the screen A, to which the lower ends of the arms C C are pivoted near its rear end, substantially as shown and described.

CONRAD P. STEINMETZ.

Witnesses:
R. D. MARTIN,
A. J. KINGS.